United States Patent [19]
LaFleur et al.

[11] Patent Number: 5,385,268
[45] Date of Patent: Jan. 31, 1995

[54] LINER OUTLET SEAL AND TOOL

[75] Inventors: Arthur E. LaFleur; Lee LaFleur, both of Manistee, Mich.

[73] Assignee: Custom Packaging Systems, Inc., Manistee, Mich.

[21] Appl. No.: 67,702

[22] Filed: May 25, 1993

[51] Int. Cl.[6] ............................................. B65D 35/56
[52] U.S. Cl. .................................... 222/105; 222/325
[58] Field of Search ............... 222/105, 181, 185, 542, 222/325; 285/351; 277/206 A, 910

[56] References Cited

U.S. PATENT DOCUMENTS

| | | | |
|---|---|---|---|
| 2,983,533 | 5/1961 | Tisch | 285/910 X |
| 3,900,221 | 8/1975 | Fouts | 285/351 X |
| 4,314,768 | 2/1982 | Goglio et al. | 222/105 X |
| 4,316,557 | 2/1982 | Benoun et al. | 222/325 X |
| 4,790,029 | 12/1988 | LaFleur et al. | 383/24 |
| 4,817,824 | 4/1989 | LaFleur et al. | 222/528 |
| 4,996,760 | 3/1991 | Coleman | 222/105 X |
| 5,040,905 | 8/1991 | Boyd | 277/206 A X |
| 5,064,096 | 11/1991 | Illing et al. | 222/105 |
| 5,158,218 | 10/1992 | Wery | 222/610 |
| 5,219,040 | 6/1993 | Meuer et al. | 222/325 X |

OTHER PUBLICATIONS

One-page Leaflet of Liquitote Systems-Steel Stock Tank Dot 57 (no date).

*Primary Examiner*—Andres Kashnikow
*Assistant Examiner*—Kenneth Bomberg
*Attorney, Agent, or Firm*—Barnes, Kisselle, Raisch, Choate, Whittemore & Hulbert

[57] ABSTRACT

A sealing spout and tools for inserting a spout of a flexible bag liner into fluid-tight sealing and anchoring engagement with a discharge outlet of a container and for removing the spout from the outlet. The spout has at least two seal rings, each having a pair of axially spaced and radially outwardly extending lobes for firmly frictionally engaging the container discharge outlet to provide a fluid-tight seal between the spout and outlet and to anchor the liner within the container. The tool has a shaft with a handle at one end for manual engagement to manipulate the tool within the container. A hydraulic or pneumatic drive is attached to the other end of the shaft for supplying force to insert or remove the spout. Carried by the drive is a collet for releasably engaging the spout to apply force to the spout during operation. Preferably, a brace is carried by the tool when inserting the spout for supporting the tool against an inner wall of the container to drive the spout into the container discharge outlet. To remove the spout, a rod is extended from the drive for securing the collet to the spout and bearing against the container discharge outlet to pull the spout from the outlet.

3 Claims, 3 Drawing Sheets

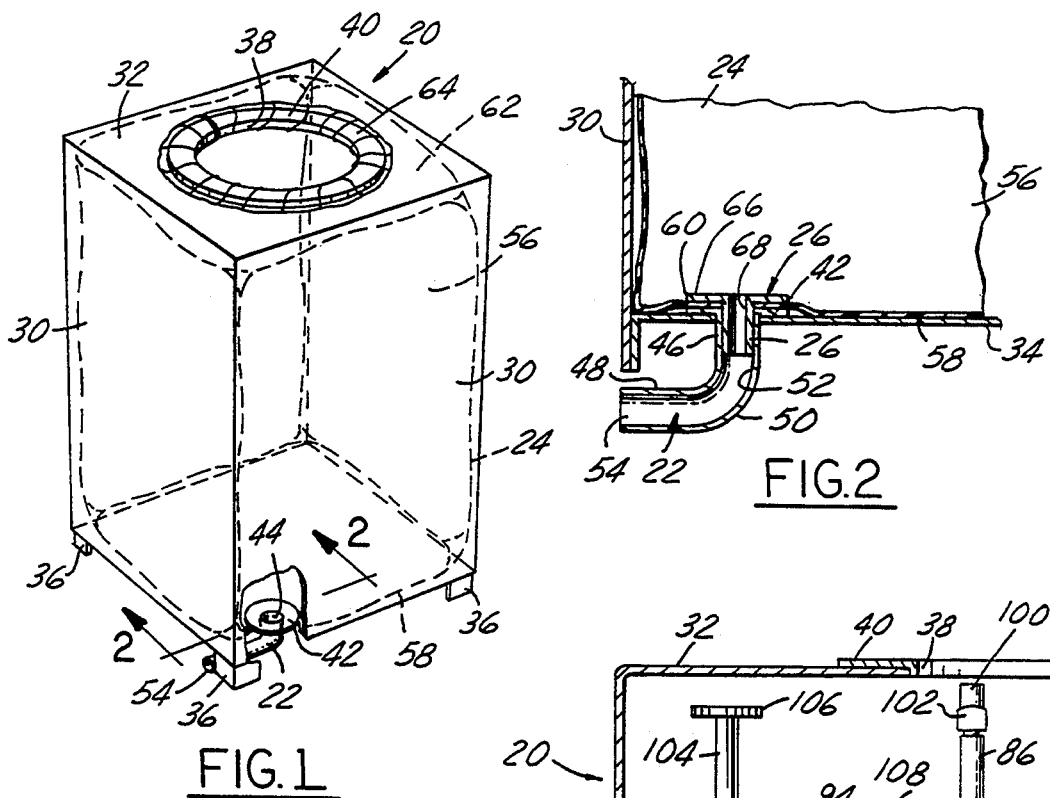
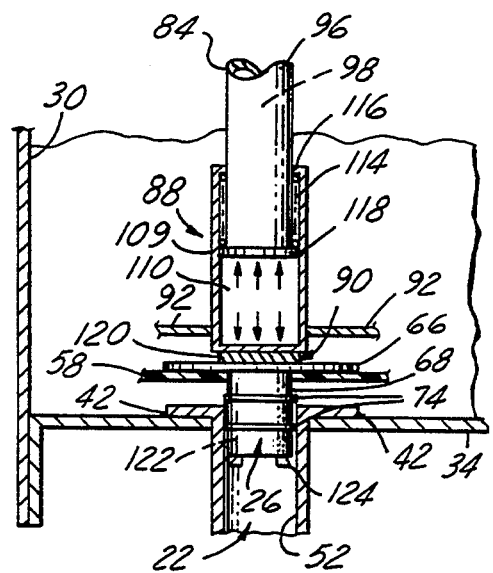
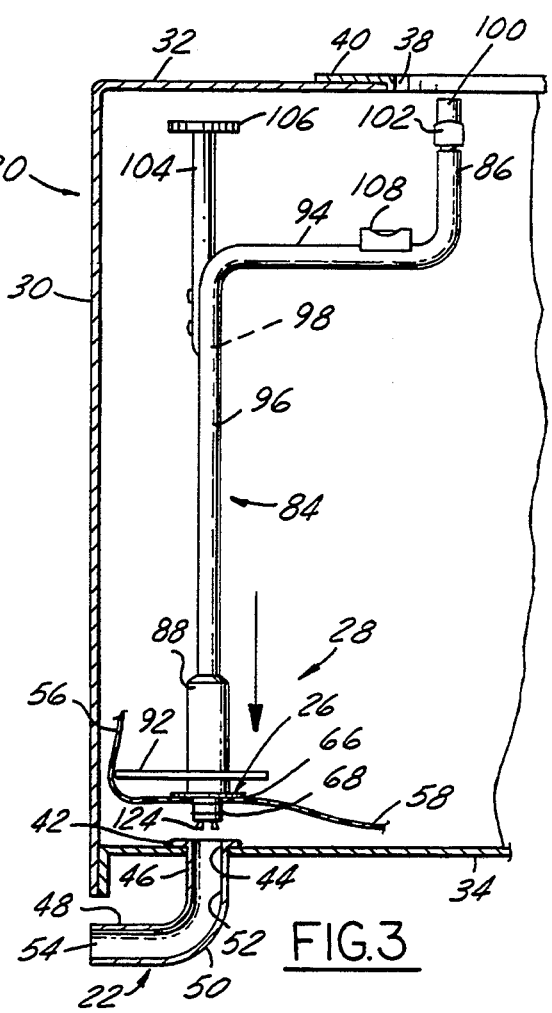

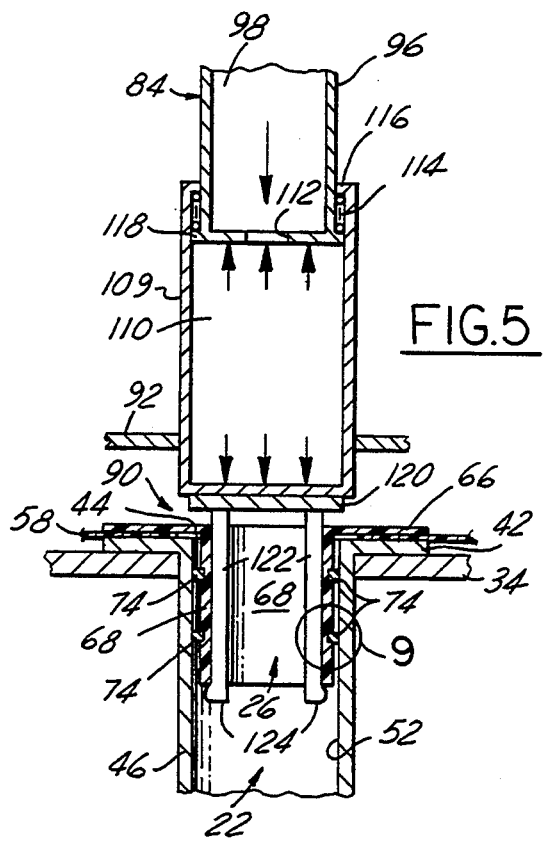
FIG.5
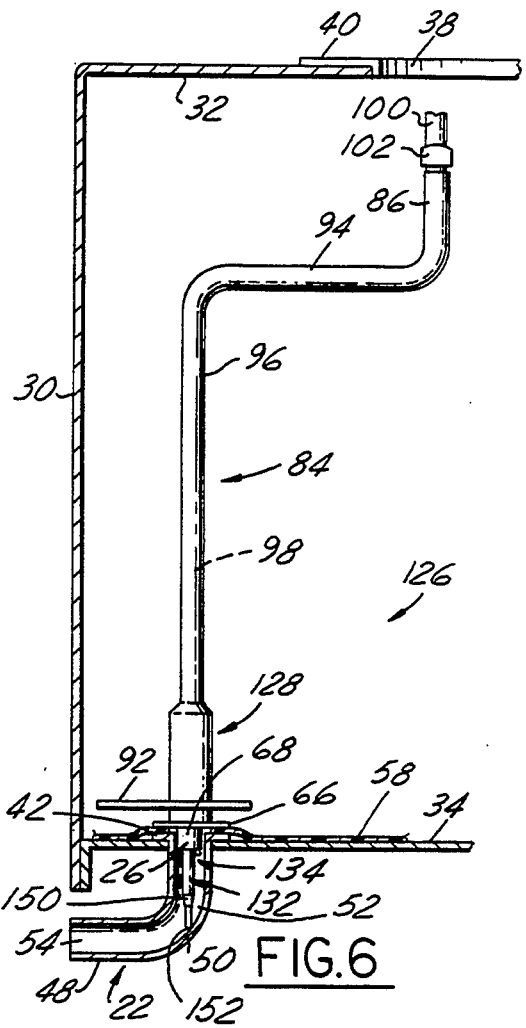
FIG.6
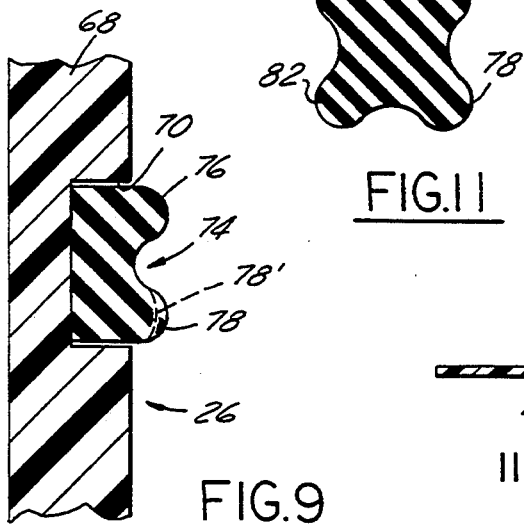
FIG.11
FIG.9
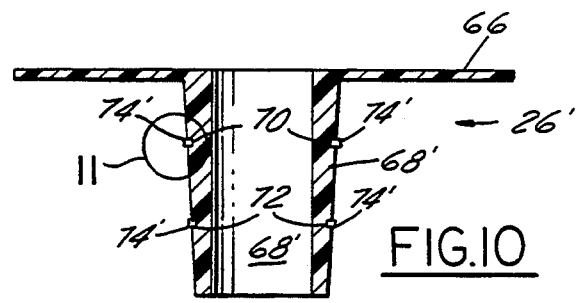
FIG.10

LINER OUTLET SEAL AND TOOL

FIELD OF THE INVENTION

This invention relates to flexible bag liners for use in a bulk container and more particularly to tools for inserting an outlet spout of the liner into a discharge outlet of the container and for removing the spout from the outlet.

BACKGROUND OF THE INVENTION

Flexible bags are frequently used to line tanks and other rigid containers to hold various types of liquids and flowable solids. Such bag liners are advantageous because they reduce or eliminate clean up of the tanks, enable highly caustic, acidic, or other chemically reactive or hazardous materials to be stored without damaging the tank, and are relatively cost effective. However, if a fluid tight seal between the outlet spout of the flexible bag liner and the tank discharge outlet is not achieved and maintained, liquid within the liner can flow around the spout and between the liner and back into the tank increasing clean up and possibly damaging the tank. Likewise, if the spout is not adequately secured within the tank outlet, the bag can float to the top of the tank as liquid is drained, pulling the spout out of the outlet and causing the contents of the bag to leak into the tank.

Unfortunately, a spout providing a fluid-tight seal and anchoring the bag within the container requires a great deal of force to both insert the spout into the discharge outlet before filling the bag and to remove the spout after emptying the bag. Entry into the container to manually engage the spout is generally impractical since it may be unsafe or difficult to maneuver within the tank, cause damage to the liner resulting in contamination of the tank, or require more force than physically available to insert or remove the spout. Similarly, a person attempting to manually insert or remove the spout from outside the tank is not likely to possess a sufficient mechanical advantage to apply an adequate amount of force to complete the task. Moreover, unless the force is applied generally along the axis of the spout, the seal may not be fluid-tight or may fail to anchor the liner when seated, removal or insertion of the spout may be more difficult, or the spout may be damaged resulting in contamination of the tank.

SUMMARY OF THE INVENTION

A bag spout for sealing and anchoring a flexible bag liner within a rigid container and tools for inserting and removing the spout from a discharge outlet of the container. The spout typically has two or more flexible and resilient seal rings received thereon for firmly frictionally engaging the container discharge outlet to provide a fluid-tight seal between the spout and outlet and to anchor the liner within the container. Preferably, each seal ring has a pair of axially spaced and radially outwardly extending lobes for more firmly frictionally engaging the inner surface of the discharge outlet. When placed within the container, a tool is used to insert the spout into firm frictional engagement with the discharge outlet. To remove the spout, a tool is used to engage the spout to pull the spout from the outlet.

The tool has a shaft with a handle at one end for manual engagement to manipulate the tool within the container during use. A hydraulic or pneumatic drive cylinder for applying force to the spout is attached to the shaft. Attached to the free end of the cylinder is a collet for releasably engaging the spout to transfer force from the drive to the spout during operation. Preferably, a brace is attached to the shaft for supporting the tool against an inner wall of the container to drive the spout into the container discharge outlet. To remove the spout, a rod is extended from the drive cylinder and through the collet for latching the collet to the spout. During removal, the free end of the rod bears against the discharge outlet to move the collet and hence draw the spout free of the outlet.

Objects, features and advantages of this invention are to provide a spout which may be inserted into firm frictional engagement with a discharge outlet of a container to provide a fluid-tight seal therewith and to anchor the bag within the container and tools which may be used to insert the spout into the discharge outlet with a minimum of manual effort and which may be used to quickly and easily remove the spout without damaging the liner and/or contaminating the container and are strong, rugged, easy to maneuver, durable, of simple design, of economical manufacture and easy to use.

BRIEF DESCRIPTION OF THE DRAWINGS

FIG. 1 is a perspective view of a bulk container broken away to illustrate a discharge outlet of the container.

FIG. 2 is a fragmentary sectional view taken along the line 2—2 of FIG. 1 showing the discharge outlet in more detail.

FIG. 3 is a fragmentary sectional view of the tank and outlet illustrating a tool of this invention for inserting a discharge spout of a flexible bag liner into the outlet.

FIG. 4 is a fragmentary sectional view of the tank and outlet, and a drive cylinder assembly of the tool shown during forcibly driving the bag spout into the container discharge outlet.

FIG. 5 is a fragmentary sectional view of the discharge outlet and drive of the tool also detailing the construction and arrangement of a pair of seal rings carried by the spout, the tool being shown during initial withdrawal from the spout after insertion of the spout into the container discharge outlet.

FIG. 6 is a fragmentary sectional view of the tank and outlet illustrating a second tool embodiment for removing the spout from the container discharge outlet.

FIG. 9 is an enlarged fragmentary sectional view of the spout detailing the seal ring illustrated in FIG. 5.

FIG. 10 is a sectional elevation view of a tapered discharge spout illustrating a second seal ring embodiment received on the spout.

FIG. 11 is an enlarged sectional view of the second seal ring shown in FIG. 10.

DETAILED DESCRIPTION OF THE INVENTION

Figure 7:
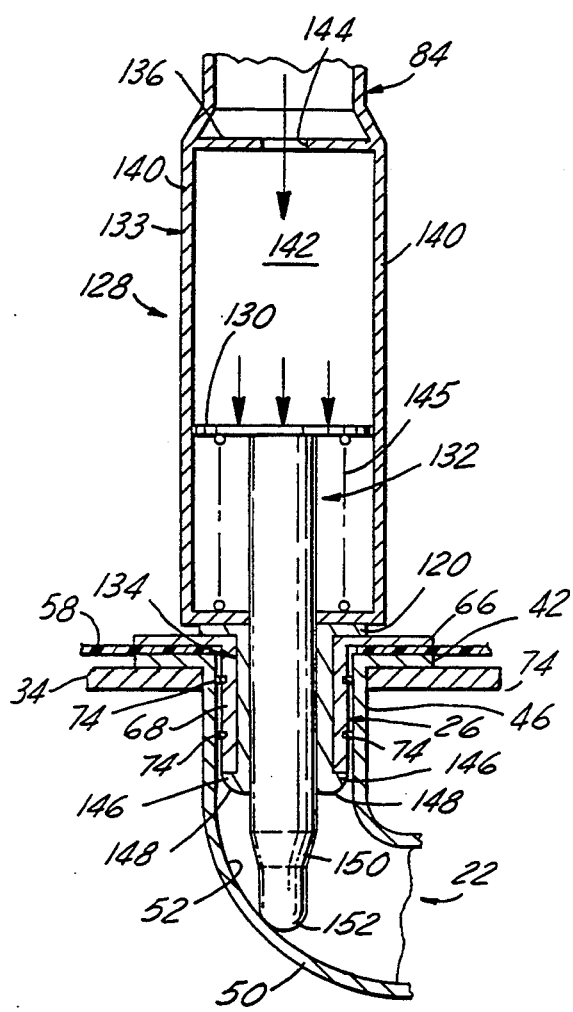
FIG. 7 is a fragmentary sectional view of the outlet and a drive of the second tool shown engaging a seated spout.

Referring in more detail to the drawings, FIGS. 1–3 illustrate a container 20 having a tubular discharge outlet 22 in which a flexible bag liner 24 having an attached discharge spout 26 is received. A tool 28 is used to insert the spout 26 into the outlet 22.

The container 20 has sidewalls 30, a top wall 32, and a bottom wall 34 to receive and support the bag 24 and feet 36 depending from the bottom 34 to support the container 20. Preferably, the sidewalls 30 and bottom 34 are each rigid, of one-piece construction, and independently capable of constraining the contents of the bag 24. Preferably, the top wall 32 has a filler opening 38 which may be encompassed by a collar 40 surrounding the opening 38. If desired, the container 20 may be a housing, tank, cage, collapsible container, or any other receptacle capable of receiving and supporting the bag 24.

The discharge outlet 22 preferably depends downwardly from the bottom wall 34 of the container 20 and has a flange 42 around the mouth or inlet opening 44 of the outlet 22 which is welded or otherwise attached to the bottom 34. From inlet opening 44, a downwardly extending leg 46 of the outlet 22 is joined to a generally horizontal leg 48 by an elbow 50. To telescopically receive the generally cylindrical spout 26 of the bag 24 within the discharge outlet 22, the inlet opening 44 and inner peripheral surface 52 of the vertical leg 46 are preferably generally circular in cross section. The discharge outlet 22 preferably has a control valve or another flow control device (not shown) disposed at its discharge end 54 for controllably emptying the contents of the bag 24 from the container 20.

Preferably, the bag liner 24 is conformable to the interior of the container 20 and is constructed of a flexible material impervious to its intended contents such as low or high density polyethylene, polypropylene or other plastic material. The bag liner 24 has a sidewall 56, a bottom wall 58 and a discharge outlet opening 60 located in the bottom 58. The outlet opening 60 is preferably generally coaxially aligned with the mouth 44 of the discharge outlet 22 when the spout 26 is seated in the discharge outlet 22 of the container 20. Preferably, the bag 24 has a top wall 62 with a flexible filling spout 64 located in the top wall.

The discharge spout 26 is of one-piece tubular construction having an outwardly extending flange 66 attached to one end of a generally cylindrical and self-supporting tube 68 and is preferably constructed of a low or high density polyethylene, polypropylene, or some other similarly durable, and generally chemically inert material. Flange 66 is preferably sealed and permanently affixed to the interior surface of liner 24 around the entire periphery of the bag discharge outlet 60 by a circumferentially continuous heat or adhesive seal (not shown). While the spout 26 preferably has a tube 68 of generally circular and uniform cross section extending from the flange 66, a spout 26' with a tube 68' having a radially tapered outer surface, as shown in FIG. 10, may be used. The tubes, 68 and 68', each preferably have at least two circumferentially continuous grooves 70, 72 in the outer surface, each for receiving a seal ring 74 or 74' therein.

As shown more particularly in FIGS. 5 & 9, a circumferentially continuous seal ring 74 is received within each groove 70, 72 of the discharge spout tube 68. Preferably, each ring 74 is an O-ring of a resilient, chemically inert plastic, neoprene rubber or some other elastomeric material. When the tube 68 is received within the discharge outlet 22, such as is shown in FIG. 5, each seal ring 74 firmly frictionally engages the inner peripheral surface 52 of the outlet 22 to provide a fluid-tight seal between the spout 26 and the outlet 22 and to anchor the liner 24 within the container 20. Additional seal rings may be provided if more anchoring force or a redundant seal is desired.

As is illustrated more clearly in FIG. 9, each seal ring 74 preferably has radially outwardly extending upper and lower lobes 76 & 78 which provide an interference fit between the spout 26 and the discharge outlet 22 for firm frictional engagement therebetween. If additional frictional and sealing engagement between each ring and the tube 68 is desired, rings 74' (FIG. 11) can be used which also have a pair of axially spaced and radially inwardly extending lobes 80, 82. To facilitate insertion, each ring 74 and 74' may be radially tapered having a lower lobe 78' of reduced radius as shown in phantom in FIG. 11. Preferably, the lobes 76, 78 of each sealing ring 74 are lubricated with water, oil or a Teflon grease to ease insertion into the discharge outlet 22.

FIGS. 3-5 illustrate a tool 28 of this invention for inserting a spout 26 of a flexible bag liner 24 into a discharge outlet 22 of a container 20. The tool 28 has a shaft 84 with a handle 86 at one end for manual engagement to position the spout tube 68 generally coaxially over the inlet opening 44 of the outlet 22. Attached to the opposite end of shaft 84 is a preferably pneumatic or hydraulic drive cylinder 88 for providing force adequate to telescopically insert the spout 26 into firm frictional engagement with the discharge outlet 22. To releasably retain the spout, a collet 90 is attached to the end of the drive cylinder 88. Preferably, a collar 92, of a durable material such as PLEXIGLAS, extends outwardly from the drive cylinder 88 to prevent the liner 24 from becoming disposed over the inlet opening 44 of the discharge outlet 22 and/or tangled with the tool 28 and being damaged during insertion of the spout 26.

For use with containers having a discharge outlet spaced laterally from the filler opening, the tool 28 preferably has a generally horizontal leg 94 extending between the handle 86 and the shaft 84 to dispose the handle 86 adjacent the container inlet 38. To reach the outlet 22, the shaft 84 has a generally vertical section 96 of sufficient length. An internal passageway 98 within the shaft 84 is connected at one end to a supply hose 100 by a coupling 102 attached to the free end of the handle 86 and is in communication at the opposite end with the drive cylinder 88 to supply a suitable fluid to power the cylinder 88 during operation. The shaft 84 preferably has a brace 104 with a generally flat support plate 106 attached to the free end for bearing against the inner surface of the container top wall 32 to restrain upward movement of the tool 28 during insertion of the spout 26. If desired, the support plate 106 may be padded to prevent damaging the liner 24 during operation. Preferably, the handle 86 or shaft 84 has a level indicator 108 in a visible position for assisting an operator of the tool 28 to more accurately coaxially align the shaft section 96 and brace 104 with the inlet opening 44 of the discharge outlet 22 to properly insert the spout 26 therein. A fluid-tight fitting (not shown) may be provided on the shaft 84 to remove or change the drive cylinder 88 and collet 90.

As shown in FIGS. 4 and 5, the drive cylinder 88 has a movable, generally cylindrical sleeve and piston 109 telescoped over and slidably received on the shaft section 96. Within the cylinder 88 is a chamber 110 for receiving air or hydraulic fluid from an opening 112 in the end of the shaft 84 to extend the sleeve 109 during operation to insert the spout 26. In response to increasing pressure within the chamber 110, the sleeve 109 will move from a generally retracted position (FIG. 4) to an extended position (FIG. 5) for exerting sufficient force against the spout 26 to seat it into firm frictional engagement with the container discharge outlet 22. Preferably, the cylinder 88 has a spring 114 disposed between an inturned lip 116 of sleeve 109 and a flange 118 of the shaft 84 biased to return the cylinder 88 to the retracted position when the pressure within the chamber 110 is relieved to facilitate withdrawing the collet 90 from the spout 26 after the tube 68 has been inserted. To prevent the cylinder 88 from disengaging from the shaft 84 when fully extended, the cylinder 88 stops against the spring 114 when fully compressed (FIG. 5).

The collet 90 is attached to the free end of the drive cylinder 88 for movement in unison therewith during operation. The collet 90 has a base 120 attached to the end of the cylinder 88 which is preferably larger than the mouth of the spout 26 to bear on its flange 66 to assist in driving the tube 68 and seal rings 74 into the discharge outlet 22. At least two flexible fingers 122 depend from the collet base 120 and project into the tube 68 to releasably retain the spout 26 on the collet 90. Preferably, each finger 122 is yieldingly biased outwardly to frictionally engage against the inner diametral surface of the spout tube 68 when inserted therethrough. The end of each finger 122 preferably has an outwardly projecting retainer detent 124 for providing an interference fit with the tube 68 to releasably retain the spout 26 on the collet 90 as shown in FIG. 5. Preferably, the leading and trailing edge of each detent 124 are generally rounded to cammingly facilitate insertion and removal of the spout 26.

Figure 8:
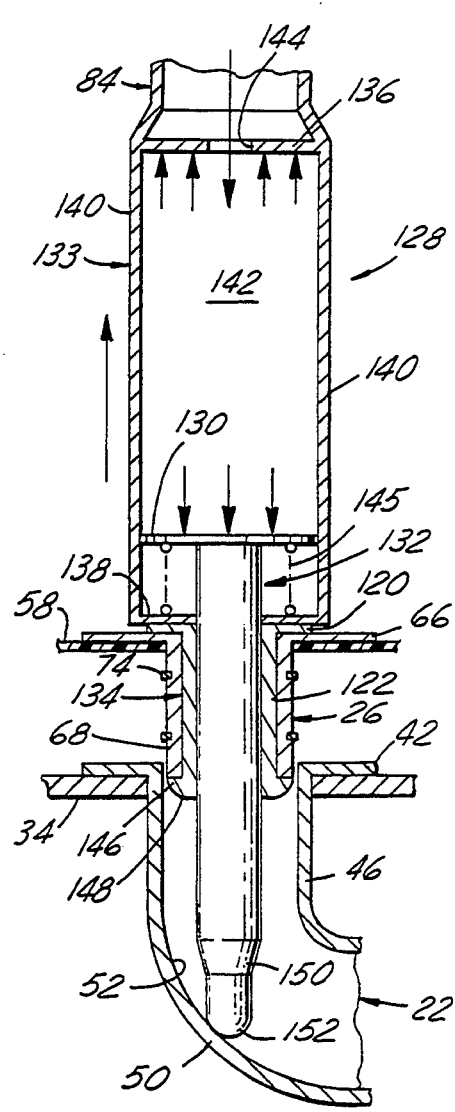
FIG. 8 is a fragmentary sectional view of the outlet and drive of the second tool shown removing the spout from the discharge outlet.

FIGS. 6–8 illustrate a tool 126 for removing the spout of a flexible bag liner from a discharge outlet of a container. The tool 126 has a shaft 84 with a handle 86 at one end for manipulating the tool into engagement with the spout 26. Shaft 84 is constructed and arranged to fit the container it is received in, as previously discussed, and hence will not be further described. For providing force to unseat the spout 26, a drive cylinder 128 is attached to the shaft 84 and has a piston 130 and rod 132 slidably received in a casing 133 fixed to the end of the shaft 84. A collet 134 for releasably gripping the spout 26 during removal is attached to the lower end of the cylinder 128. The rod 132 passes through the collet 134 and when extended bears on the elbow 50 of the discharge outlet 22 for lifting an engaged collet 134 to pull the spout 26 out of the outlet 22.

As shown in FIGS. 7 and 8, the cylinder casing 133 has a top end wall 136 attached to the shaft 84, a bottom end wall 138 and a preferably cylindrical sidewall 140 defining a drive cylinder chamber 142. At one end of the chamber 142 is an inlet opening 144 in the top wall 136 communicating with the passageway 98 within the shaft 84. Preferably, a spring 145 is disposed between the piston 130 and bottom wall 138 of the casing 133 to retract the rod 132 when the pressure within the chamber 142 is relieved for withdrawing the tool 126 and spout 26 from the container 20.

Collet 134 is essentially the same as collet 90 except that the free end of each finger 122 has a pawl 146 projecting outwardly for underlying and positively gripping the outer axial end of the spout tube 68 to transmit a pulling force to the spout 26 during removal. Preferably, each pawl 146 has a contoured leading edge 148 to ease insertion of each finger 122 into the spout tube 68. In all other respects, the collet 134 has essentially the same construction as collet 90.

To facilitate insertion and removal of the collet 134 into and from the spout 26, each collet finger 122 flexes to move the pawl 146 radially inward when the rod 132 is fully retracted into the drive cylinder 128. Preferably, the rod 132 has a tapered portion 150 adjacent the free end for providing clearance between each finger 122 and the rod 132 when retracted to allow each finger 122 to flex freely. When the pawls 146 underlie the free end of the spout tube 68 and the rod 132 is extended through the collet 134, the rod 132 prevents the pawls 146 from moving radially inward and disengaging from the spout tube 68. When the rod 132 is extended beyond the collet 134, the rod 132 and flange 120 of collet 134 help to seal the mouth and throat of the spout tube 68 for preventing the remaining contents of the bag 24 from leaking out the spout 26 during removal and contaminating the container 20. As the rod 132 is further extended (FIG. 8), the free end of the rod 132 bears against the discharge outlet elbow 50 and then continued pressure fluid expansion of chamber 142 forces casing 33 and hence the collet 134 upwardly to unseat and extract the spout 26 from the outlet 22. To avoid damaging the elbow 50 during removal, the free end of the rod 132 preferably has a rounded tip 152. Alternatively, a tip of a protective material, such as rubber, may be affixed to the free end of the rod 132 (not shown).

In using tool 28 to insert the spout 26, the collet 90, drive cylinder 88 and shaft 84 are inserted through the filler spout 64 of the bag liner 24 and manipulated within the bag 24 until the collet 90 is received by the spout 26. As the collet 90 is inserted into the tube 68, the retainer detents 124 are cammingly received within the tube 68, flexing the collet fingers 122 inwardly. When the detents 124 exit the opposite end of the tube 68 they snap outwardly to releasably retain the tube 68 on the collet 90. With the spout 26 on the collet 90, the tool 28 is used to manipulate the liner 24 and spout 26 within the container 20 until the tube 68 is positioned over the inlet opening 44 of the container discharge outlet 22, and in general coaxial alignment therewith. If provided, the level 108 is preferably used to assist the tool operator in positioning the shaft 84 vertically to more accurately coaxially align the spout 26 with the inlet opening 44 before inserting the spout 26 into the outlet 22.

In operation, air or hydraulic fluid is controllably introduced into the drive cylinder chamber 110 extending the sleeve 109 and lifting the tool 28 until the support plate 106 of the brace 104 bears against the inner surface of the container top wall 32. With the tool 28 supported within the container 20, the sleeve 109 is extended further, pushing the collet 90 downwardly and driving the spout tube 68 into the discharge outlet 22 as illustrated in FIG. 4. The sleeve 109 and collet 90 are extended until the seal rings 74 on the tube 68 firmly frictionally engage the inner wall 52 of the discharge outlet 22 providing a fluid-tight seal between the spout 26 and outlet 22 and anchoring the bag 24 within the container 20. Preferably, the spout 26 is inserted into the outlet 22 until the associated portion of liner bottom wall 58 affixed to the underside of the flange 66 of the spout 22 abuts against the bottom of the container 20, as shown in FIG. 5. To remove the tool 28, the fluid pressure is relieved, the sleeve 109 of the drive cylinder 88 is retracted, and by manually manipulating the tool 28, the collet fingers 122 are pulled and removed from the spout 26, and the tool is lifted out of the container 20.

To remove the spout 26 from the discharge outlet 22 for removing an empty bag liner 24 from the container 20, the tool 126 of FIG. 6 is manually inserted into the container 20 and manipulated to insert the collet 134 into the spout tube 68. With the rod 132 retracted, a generally downwardly pressure is manually applied to the tool handle 86 to cause the leading edge 148 of each pawl 146 to cammingly engage the inner surface of the tube 68 to flex each collet finger 122 inwardly for being telescopically received by the spout 26. Each pawl 146 snaps outwardly when it completely passes through the tube 68 to grip the spout 26 to pull the tube 68 out of the discharge outlet 22 during operation.

In operation, the drive cylinder 128 is powered to extend the drive rod 132 through the collet 134 for retaining the pawls 146 of the fingers 122 in engagement with the spout tube 68 to latch the collet 134 to the spout 26. As the rod 132 is further extended when its tip 152 bears against the elbow 50 of the discharge outlet 22, it causes a generally upwardly directed removal force to be applied to the spout 26 by the collet 134 (FIG. 7). As pressure increases within the drive cylinder 128, the rod 132 displaces the collet 134 upwardly pulling the spout tube 68 and seal rings 74 out of the discharge outlet 22 (FIG. 8).

Upon extracting the spout 26 from the outlet 22, the tool 126, bag 24 and spout 26 are removed from the container 20. If necessary, the drive rod 132 may be retracted into the drive cylinder 128 to provide sufficient clearance for removing the tool 126 from the container 20. With the rod 132 retracted, the collet fingers 122 may be manually flexed inwardly to disengage the pawls 146 from the spout tube 68 to remove the spout 26 from the collet 134.

Additional anchoring force can also be provided by using seal rings 74 of different and increasing outside diameter from the free end to the flange end of the spout tube 68 thereby effectively achieving a tapered arrangement of the seal rings on the spout tube.

We claim:

1. For use in a bulk container having sidewalls, rigid end walls and a discharge outlet tube, and wherein a bag can be received in and supported by the container, a bag comprising:

(a) a collapsible container liner of a flexible material having a bottom wall and a sidewall, and a discharge outlet opening in one of said walls;

(b) a self supporting rigid spout having a generally cylindrical discharge tube extending through said liner discharge outlet opening and being open at opposite ends thereof, one of said tube ends being disposed interiorly of said one liner wall and the other of said tube ends being disposed exteriorly of said one liner wall, said spout also having an external rigid flange adjacent said one interiorly disposed tube end extending radially outwardly in encircling relation to said tube, said spout being permanently affixed and sealed at said one end to said collapsible container liner by a circumferentially continuous seal formed between a surface of said flange facing toward said other tube end and an interior surface of said liner and encompassing said discharge outlet opening of said liner thereof, said tube being constructed and arranged to be telescopically forcibly driven into and received within the discharge outlet tube of the generally rigid bulk container;

(c) at least two discrete axially spaced apart circumferentially continuous and radially outwardly extending annular elastomeric flexible seals carried on said tube and dimensioned to have a sliding, sealing friction force fit engagement against a radially inner peripheral surface in the container discharge outlet tube when said spout tube is inserted into the container outlet to provide a fluid-tight seal between a radially outer peripheral surface of said tube and the container discharge outlet and to firmly releasably secure the spout to the discharge outlet to anchor the bag liner within the container, and (d) said tube having at least two discrete circumferentially continuous grooves axially spaced apart in said outer peripheral surface thereof, each of said grooves individually receiving one of said at least two seals therein.

2. The bag of claim 1 wherein each of said seals also comprise at least two radially outwardly projecting axially spaced annular lobes for firmly frictionally engaging against the inner surface of the discharge outlet of the rigid container.

3. The bag of claim 1 wherein said at least two seals each comprise a ring of a flexible, resilient elastomeric material having a first and a second axially spaced radially inwardly extending lobe for providing a seal between said ring and the radially outer peripheral surface of said tube of said spout and a first and second axially spaced radially outwardly extending lobe for providing a seal between said ring and the radially inner peripheral surface of the discharge spout of the container.

* * * * *